US012736105B2

(12) United States Patent
Nakazato et al.

(10) Patent No.: US 12,736,105 B2
(45) Date of Patent: Sep. 15, 2026

(54) DAMPER

(71) Applicant: PIOLAX, INC., Kanagawa (JP)

(72) Inventors: Hiroshi Nakazato, Kanagawa (JP); Takumi Hashimoto, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 399 days.

(21) Appl. No.: 18/279,553

(22) PCT Filed: Sep. 29, 2021

(86) PCT No.: PCT/JP2021/035894
§ 371 (c)(1),
(2) Date: Aug. 30, 2023

(87) PCT Pub. No.: WO2022/195932
PCT Pub. Date: Sep. 22, 2022

(65) Prior Publication Data

US 2024/0301937 A1 Sep. 12, 2024

(30) Foreign Application Priority Data

Mar. 15, 2021 (JP) ................................ 2021-041851

(51) Int. Cl.
*F16F 15/08* (2006.01)
*E05F 5/02* (2006.01)

(52) U.S. Cl.
CPC .............. *F16F 15/085* (2013.01); *E05F 5/02* (2013.01); *E05Y 2201/212* (2013.01);
(Continued)

(58) Field of Classification Search
CPC ............. F16F 15/085; F16F 2230/0005; F16F 2232/08; F16F 2236/04; F16F 7/00;
(Continued)

(56) References Cited

U.S. PATENT DOCUMENTS 4,893,796 A * 1/1990 Hickman .............. F16F 15/067
267/136
5,946,946 A * 9/1999 Sharp ........................ F16F 3/10
68/23.1

(Continued)

FOREIGN PATENT DOCUMENTS

JP S63-009447 Y2 3/1988
JP 2001-324026 A 11/2001

(Continued)

OTHER PUBLICATIONS

Nov. 9, 2021, International Search Report issued for related PCT Application No. PCT/JP2021/035894.

(Continued)

*Primary Examiner* — Vishal R Sahni
(74) *Attorney, Agent, or Firm* — Paratus Law Group, PLLC

(57) ABSTRACT

A damper includes: a piston configured to advance and retreat by receiving a force from another of a first member and a second member; a sliding member configured to slide on the piston as the piston advances and retreats; and a support member having a tubular portion and an insertion hole formed inside the tubular portion. The piston is inserted through the insertion hole. The sliding member includes a protruding portion protruding inward in a radial direction inside the tubular portion and configured to come into contact with an outer peripheral surface of the piston, an outer tubular portion disposed outside the tubular portion, and an extending portion extending inward in the radial direction from one end of the outer tubular portion and indirectly or directly coupling the protruding portion and the outer tubular portion.

19 Claims, 16 Drawing Sheets

(52) U.S. Cl.
CPC . *E05Y 2900/532* (2013.01); *F16F 2230/0005* (2013.01); *F16F 2232/08* (2013.01); *F16F 2236/04* (2013.01)

(58) Field of Classification Search
CPC ....... F16F 15/04; E05F 5/02; E05Y 2201/212; E05Y 2201/474; E05Y 2201/48; E05Y 2900/532; E05Y 2600/314
See application file for complete search history.

(56) References Cited

U.S. PATENT DOCUMENTS

| | | | | |
|---|---|---|---|---|
| 6,474,113 | B1 * | 11/2002 | Park | D06F 37/24 68/23.3 |
| 9,279,207 | B2 * | 3/2016 | Yu | D06F 37/22 |
| 9,677,212 | B2 * | 6/2017 | Jackson | D06F 37/24 |
| 10,145,441 | B2 * | 12/2018 | Zhu | F16F 13/002 |
| 10,428,896 | B2 * | 10/2019 | Zimmer | F16F 9/19 |
| 10,519,584 | B2 * | 12/2019 | Na | D06F 37/20 |
| 11,230,869 | B2 * | 1/2022 | Weber | F16F 13/007 |
| 12,312,728 | B2 * | 5/2025 | Moroz | F16F 7/08 |
| 2010/0212109 | A1 * | 8/2010 | Kim | E05F 5/006 16/85 |
| 2012/0292842 | A1 * | 11/2012 | Van Der Zyppe | F16F 9/58 267/292 |
| 2014/0150207 | A1 | 6/2014 | Hattori et al. | |
| 2017/0292215 | A1 * | 10/2017 | Na | F16F 7/08 |
| 2017/0321776 | A1 * | 11/2017 | Bauer | F16F 7/09 |
| 2020/0408270 | A1 * | 12/2020 | Kato | F16F 7/09 |
| 2020/0408271 | A1 * | 12/2020 | Ito | F16F 9/19 |
| 2021/0148148 | A1 * | 5/2021 | Weber | E05F 3/12 |
| 2021/0324935 | A1 * | 10/2021 | Yamashita | F16F 9/32 |

FOREIGN PATENT DOCUMENTS

| | | |
|---|---|---|
| JP | 2013-019467 A | 1/2013 |
| JP | 2015-168409 A | 9/2015 |

OTHER PUBLICATIONS

Nov. 9, 2021, International Search Opinion issued for related PCT Application No. PCT/JP2021/035894.

* cited by examiner

DAMPER

CROSS REFERENCE TO PRIOR APPLICATION

This application is a National Stage Patent Application of PCT International Patent Application No. PCT/JP2021/035894 (filed on Sep. 29, 2021) under 35 U.S.C. § 371, which claims priority to Japanese Patent Application No. 2021-041851 (filed on Mar. 15, 2021), which are all hereby incorporated by reference in their entirety.

TECHNICAL FIELD

The present invention relates to a damper that is interposed between a first member and a second member to suppress vibration of the second member with respect to the first member.

BACKGROUND ART

For example, an automobile such as a hatch back, a wagon, a van or the like is provided with a back door for opening and closing a cargo compartment in a rear part. An edge portion of the back door is brought into contact with a peripheral edge portion of an opening of the cargo compartment via a rubber-like stopper or the like, and the back door closes the opening of the cargo compartment. However, a vibration or the like during travelling or idling may cause the back door to resonate with a vehicle body and produce an unpleasant noise.

Patent Literature 1 discloses an annular seal that is in sliding contact with an outer peripheral surface of a shaft member. The seal has an X-shape in cross section, and has a lip portion that is in sliding contact with the shaft member.

CITATION LIST

Patent Literature

Patent Literature 1: JP2001-324026A

SUMMARY OF INVENTION

Technical Problem

In the seal disclosed in Patent Literature 1, the lip is the only part that is in contact with the shaft member and absorbs kinetic energy, and a damping effect is small. In order to improve damping performance, it is preferable that a portion that is in contact with the shaft member and absorbs the kinetic energy is large.

An object of the present invention is to provide a damper with improved damping performance.

Solution to Problem

In order to solve the above problem, a damper according to an embodiment of the present invention is a damper configured to be interposed between a first member and a second member to suppress vibration of the second member with respect to the first member, the damper including: a fixing member configured to be fixed to one of the first member and the second member, and including a tubular portion and an insertion hole formed inside the tubular portion: a piston inserted through the insertion hole and configured to advance and retreat by receiving a force from another of the first member and the second member; and a sliding member configured to slide on the piston as the piston advances and retreats. The sliding member includes a protruding portion protruding inward in a radial direction inside the tubular portion and configured to come into contact with an outer peripheral surface of the piston, an outer tubular portion disposed outside the tubular portion, and an extending portion extending inward in the radial direction from one end of the outer tubular portion and indirectly or directly coupling the protruding portion and the outer tubular portion.

Another aspect of the present invention is a damper configured to be interposed between a first member and a second member, configured to be fixed to one of the first member and the second member, and configured to suppress vibration of the second member with respect to the first member. The damper includes: a piston configured to advance and retreat by receiving a force from another of the first member and the second member; a sliding member configured to slide on the piston as the piston advances and retreats; and a support member having a tubular portion and an insertion hole formed inside the tubular portion. The piston is inserted through the insertion hole, and the sliding member includes a protruding portion protruding inward in a radial direction inside the tubular portion and configured to come into contact with an outer peripheral surface of the piston, an outer tubular portion disposed outside the tubular portion, and an extending portion extending inward in the radial direction from one end of the outer tubular portion and indirectly or directly coupling the protruding portion and the outer tubular portion.

Advantageous Effects of Invention

According to the present invention, it is possible to provide a damper with improved damping performance.

BRIEF DESCRIPTION OF DRAWINGS

FIG. 4A is a side view of the sliding member.

FIG. 4B is a sectional view of the sliding member taken along a line A-A shown in FIG. 5A.

FIG. 11A is a top view of a spring, and (b) of

FIG. 11B is a side view of the spring.

DESCRIPTION OF EMBODIMENTS

Figure 1:
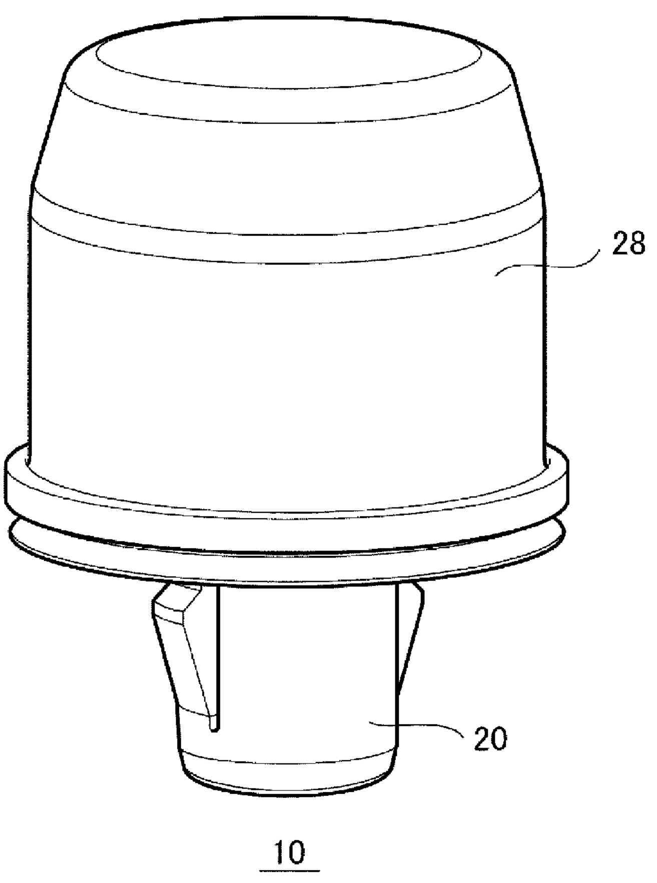
FIG. 1 is a perspective view of a damper according to an embodiment.

FIG. 1 is a perspective view of a damper 10 according to an embodiment. The damper 10 is fixed to an opening and closing body such as a door and a back door of a vehicle, and comes into contact with a panel on a vehicle body side in a state where the opening and closing body is closed. The damper 10 can absorb an impact when the opening and closing body is closed, and can suppress generation of unpleasant noise caused by resonance of the opening and closing body due to vibration of the vehicle in a state where the opening and closing body is closed. In addition, the damper 10 can absorb a distance difference between the opening and closing body and the panel on the vehicle body side in a state where the opening and closing body is closed. The damper 10 exhibits more useful damping performance as a loss coefficient increases.

The damper 10 may be fixed to a fixed body such as the panel on the vehicle body side, and may come into contact with the opening and closing body. That is, the damper 10 is fixed to one of the opening and closing body and the fixed body, and can come into contact with the other of the opening and closing body and the fixed body. Further, the damper 10 is not limited to being fixed to the door of the vehicle, and may be provided on a fixed body having a lid body and an opening closed by the lid body. In any case, the damper 10 is interposed between a first member and a second member to suppress vibration of the second member with respect to the first member.

The damper 10 includes a fixing member 20 fixed to one of the first member and the second member, and a piston and a cover 28 capable of coming into contact with the other of the first member and the second member. In the embodiment, the fixing member 20 is inserted into and fixed to an attachment hole provided in the door of the vehicle, and the piston and the cover 28 come into contact with an opening edge on the vehicle body side when the door is closed.

Figure 2:
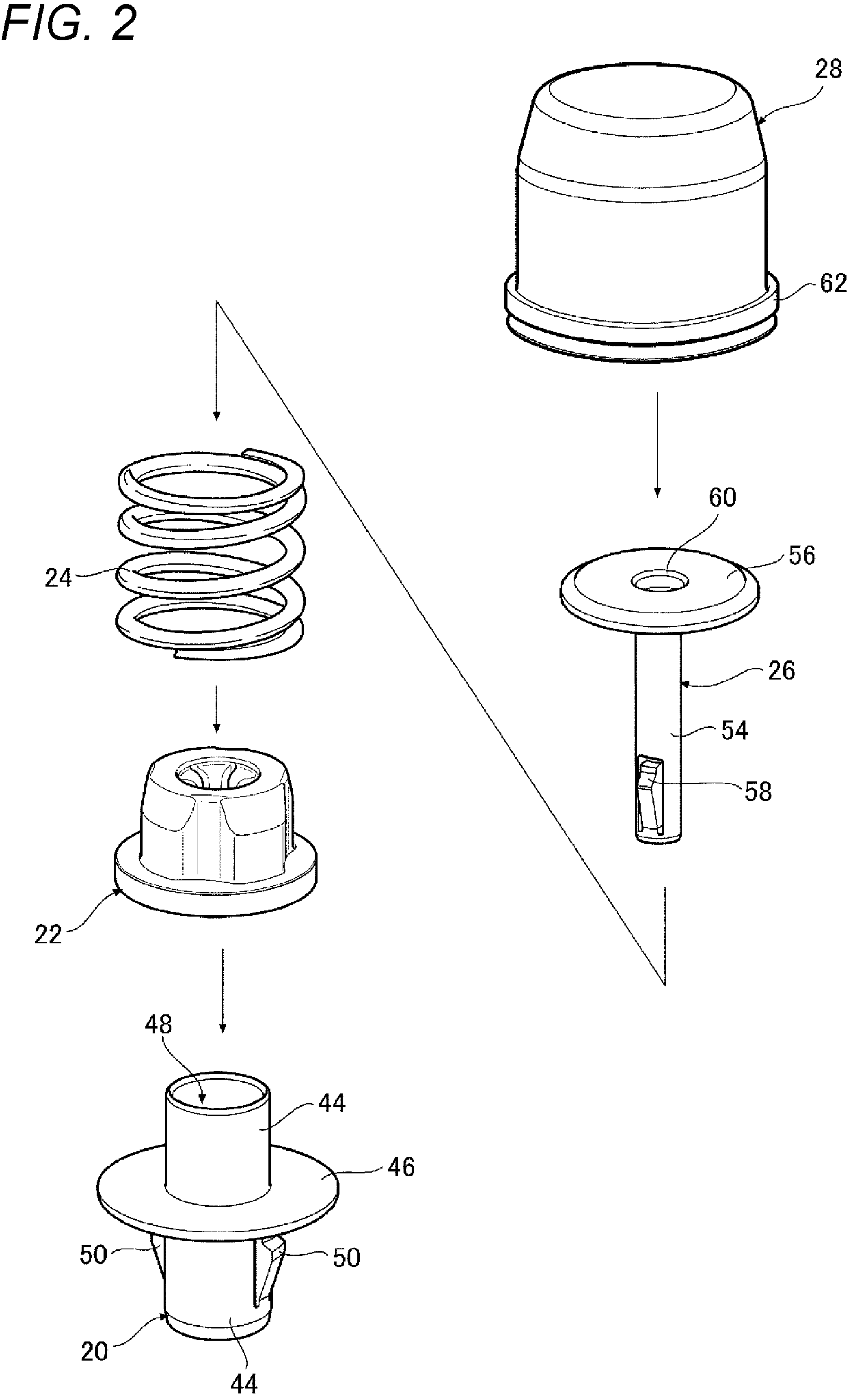
FIG. 2 is an exploded view of the damper.

FIG. 2 is an exploded view of the damper 10. The damper 10 includes the fixing member 20, a sliding member 22, a spring 24, a piston 26, and the cover 28.

The fixing member 20 includes a tubular portion 44, a flange portion 46, an insertion hole 48, locking claws 50, and an inner protruding portion (not shown). The tubular portion 44 defines the insertion hole 48 on an inner side. The piston 26 is inserted into the insertion hole 48.

The flange portion 46 protrudes outward in a radial direction from an outer peripheral surface of the tubular portion 44, and is disposed at a substantially central position of the tubular portion 44 in an axial direction. The flange portion 46 is in contact with the sliding member 22 and receives the sliding member 22. That is, the fixing member 20 also functions as a support member that supports the sliding member 22. The locking claws 50 are elastic claws formed in the tubular portion 44 and are locked to the attachment holes of the vehicle door. A method for fixing to the door is not limited to a shape of the locking claws 50, and may be another shape as long as the damper 10 can be fixed to the panel. The inner protruding portion (not shown), which will be illustrated later, is formed to protrude inward in the radial direction on an inner peripheral surface of the tubular portion 44.

The piston 26 has a shaft portion 54, a disk portion 56, a retaining portion 58, and a recessed portion 60. The shaft portion 54 is formed in a rod shape. The disk portion 56 is formed on a tip end side of the shaft portion 54, and protrudes outward in the radial direction. The recessed portion 60 is formed in the center of the disk portion 56. The retaining portion 58 is formed in a claw shape on a base end side of the shaft portion 54, and protrudes outward in the radial direction. The retaining portion 58 is caught by the fixing member 20 and retains the piston 26.

The cover 28 is formed in a cup shape with a viscoelastic material or a soft elastomer material, and covers the sliding member 22, the spring 24, and the piston 26. An engaging portion 62 of the cover 28 is engaged with an outer peripheral edge of the flange portion 46 of the fixing member 20. The cover 28 may be integrated with the piston 26, and the disk portion 56 of the piston 26 may function as a pressing portion that is pressed against the vehicle body together with the cover 28. In any case, the cover 28 and the disk portion 56 receive a force from the vehicle body.

The spring 24 is a coil spring and biases the piston 26. One end of the spring 24 is supported by the disk portion 56, and the other end of the spring 24 is supported by the flange portion 46 via the sliding member 22.

The sliding member 22 is formed in a substantially tubular shape, and is attached to the tubular portion 44 of the fixing member 20. The sliding member 22 slides on the piston 26 as the piston 26 advances and retreats, and slides on the spring 24 as the spring 24 expands and contracts. A material of the sliding member 22 is a viscoelastic material such as rubber or a soft elastomer material. In order to improve the damping performance, the sliding member 22 is 4-methyl-1-pentene α-olefin copolymer and a thermoplastic resin (excluding the copolymer) or a viscoelastic body formed of a material containing rubber or a soft elastomer. Accordingly, an appropriate sliding resistance can be applied to the piston 26 and the spring 24. The sliding member 22 is not limited to a viscoelastic body, and may be a rubber elastic body.

Figure 3:
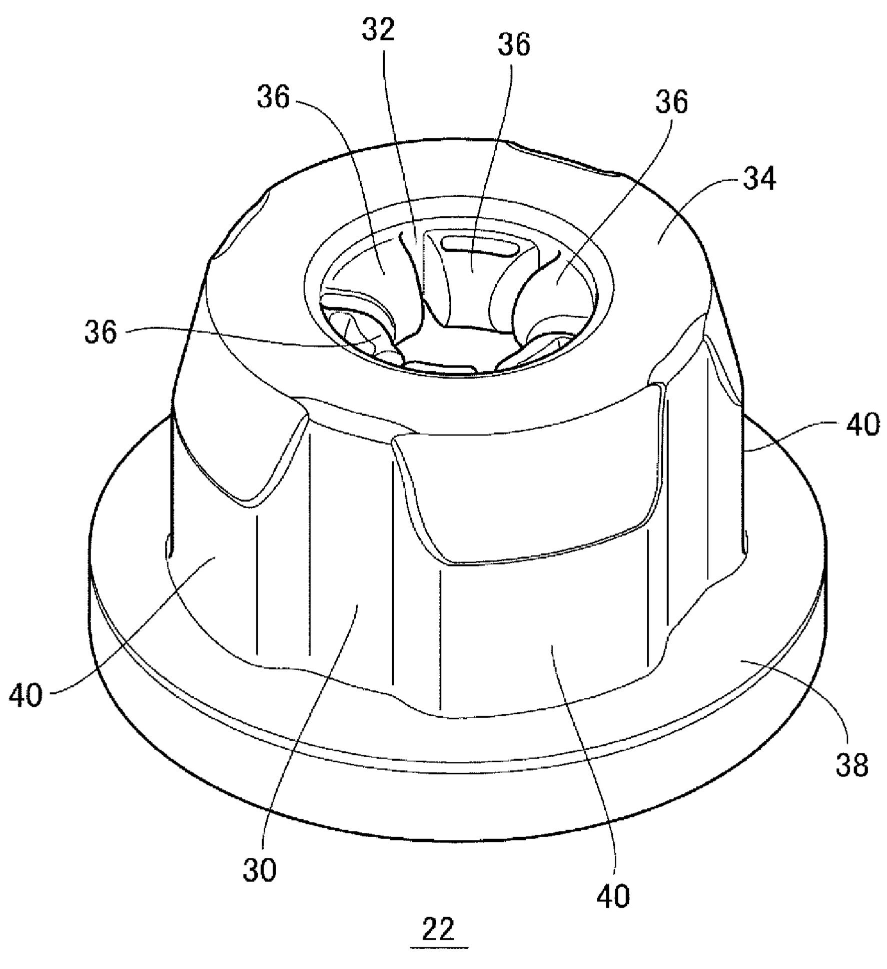
FIG. 3 is a perspective view of a sliding member.
Figures 4A, 4B:
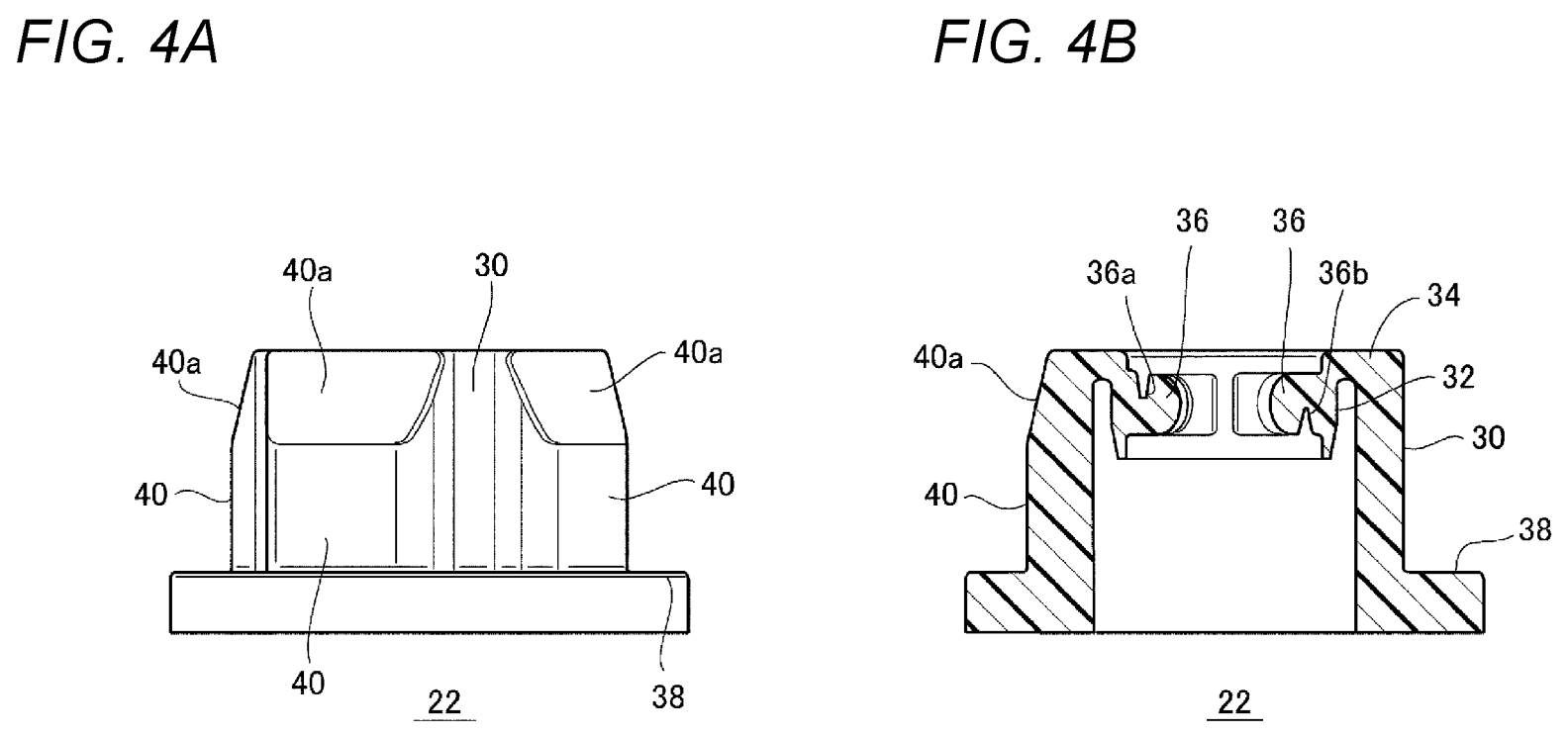
Figures 5A, 5B:
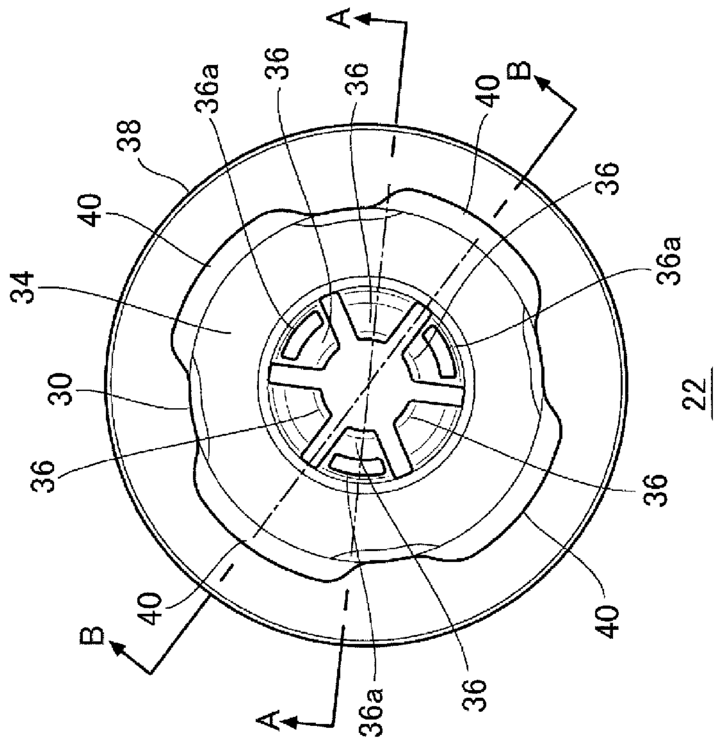
FIG. 5A is a top view of the sliding member.
FIG. 5B is a bottom view of the sliding member.
Figure 6:
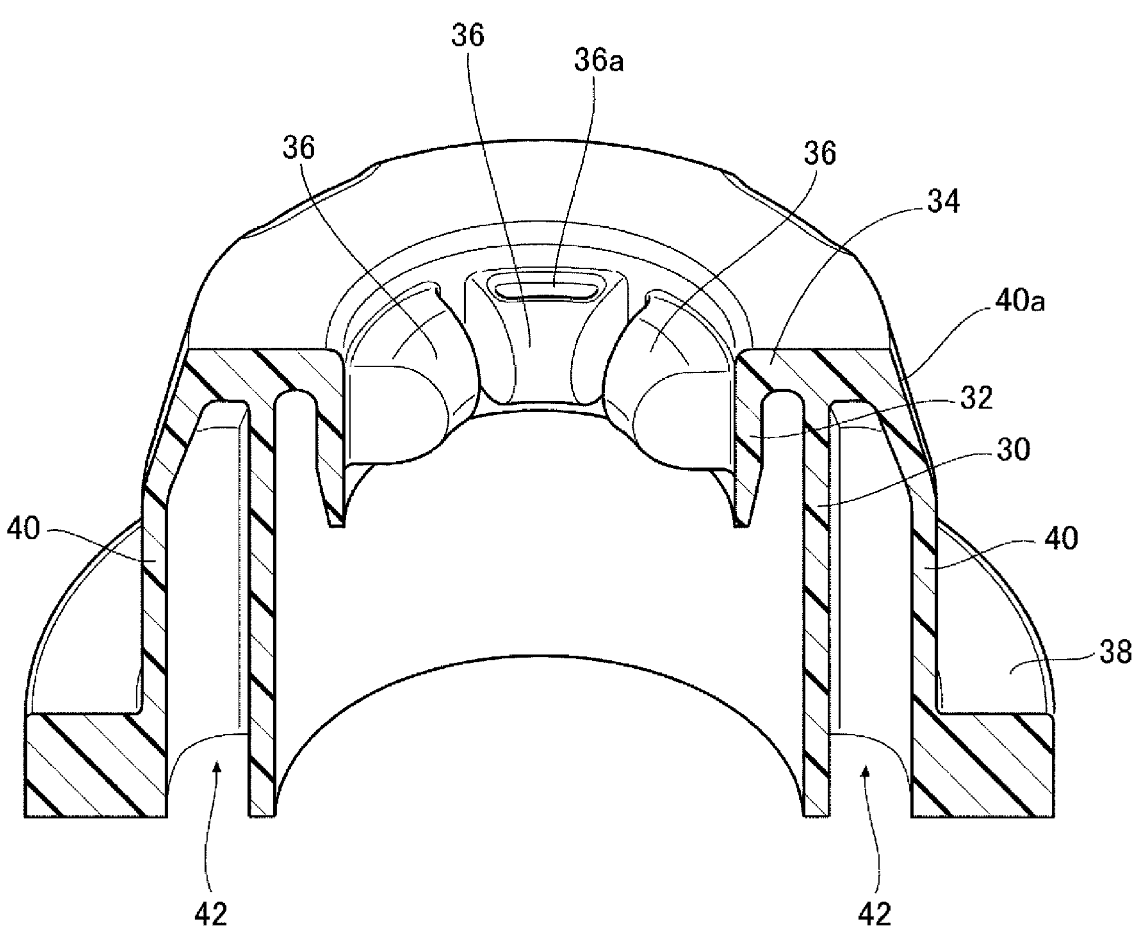
FIG. 6 is a sectional perspective view of the sliding member taken along a line B-B shown in FIG. 5A.

FIG. 3 is a perspective view of the sliding member 22. FIG. 4A is a side view of the sliding member 22, and FIG. 4B is a sectional view of the sliding member 22 taken along a line A-A shown in FIG. 5A. FIG. 5A is a top view of the sliding member 22, and FIG. 5B is a bottom view of the sliding member 22. FIG. 6 is a sectional perspective view of the sliding member 22 taken along a line B-B shown in FIG. 5A.

The sliding member 22 includes an outer tubular portion 30, an inner tubular portion 32, an extending portion 34, protruding portions 36, a base portion 38, bulging portions 40, and gap portions 42. As shown in FIG. 3 and FIG. 4B, the outer tubular portion 30 is formed in a tubular shape. As shown in FIGS. 4A, 4B and 6, the inner tubular portion 32 is formed in a cylindrical shape and is located inside the outer tubular portion 30. An axial length of the inner tubular portion 32 is shorter than that of the outer tubular portion 30, and the inner tubular portion 32 is thinner than the outer tubular portion 30. The outer tubular portion 30 and the inner tubular portion 32 are spaced apart from each other, and one end of the outer tubular portion 30 is coupled to one end of the inner tubular portion 32 by the extending portion 34.

As shown in FIG. 3 and FIG. 4B, the extending portion 34 extends inward in the radial direction from the one end of the outer tubular portion 30, forms an upper end surface of the sliding member 22, and couples to the one end of the inner tubular portion 32. That is, the extending portion 34 couples the outer tubular portion 30 and the inner tubular portion 32.

The outer tubular portion 30 and the inner tubular portion 32 are spaced apart from each other in the radial direction by the extending portion 34.

As shown in FIG. 5A, the protruding portion 36 protrudes inward in the radial direction from the inner tubular portion 32. A plurality of the protruding portions 36 are formed to be spaced apart from each other in a peripheral direction. As a result, the protruding portions 36 can come into contact with the piston 26 from a plurality of directions, and an axial movement of the piston 26 can be suppressed.

As shown in FIG. 4B, each of the protruding portions 36 is positioned so as to be axially downwardly displaced from an upper end surface of the extending portion 34 and is positioned so as to be axially upwardly displaced from a lower end of the inner tubular portion 32. Each of the protruding portions 36 may protrude from the upper end surface of the extending portion 34 or may protrude from the lower end of the inner tubular portion 32.

As shown in FIG. 5A and FIG. 5B, a first groove portion **36*a* and a second groove portion 36*b* are alternately formed in the plurality of protruding portions 36. The first groove portion 36*a* is formed to be recessed downward from above as shown in FIG. 5A, and the second groove portion 36*b* is formed to be recessed upward from below as shown in FIG. 5B. The first groove portion 36*a* and the second groove portion 36*b* (when they are not distinguished from each other, referred to as a "groove portion") are formed by notching a base end side of the respective protruding portions 36 along the peripheral direction, so that the protruding portions 36 can be easily bent in the radial direction. Further, the first groove portion 36*a* and the second groove portion 36*b* are alternately provided in the plurality of protruding portions 36, so that the piston 26** can exhibit the same sliding performance both in advance and retreat.

The base portion 38 protrudes outward in the radial direction from the outer tubular portion 30. An end (seat portion) of the spring 24 is seated on the base portion 38, and the base portion 38 is seated on the flange portion 46. The bulging portions 40 are formed so as to bulge outward in the radial direction from an outer surface of the outer tubular portion 30, and come into contact with an inner side of the spring 24. A plurality of the bulging portions 40 are formed to be spaced apart from each other in the peripheral direction. A tapered portion **40*a*, which is inclined so as to expand in diameter toward the base portion 38, is formed at one end of the bulging portion 40. The tapered portions 40*a* can suppress the spring 24 from being caught by the bulging portions 40**.

As shown in FIG. 5B and FIG. 6, the gap portions 42 are formed inside the bulging portions 40. Since the gaps are formed inside the bulging portions 40, the bulging portions 40 are easily bent in the radial direction. An upper end of the bulging portion 40 may be connected to the outer tubular portion 30, and a lower end of the bulging portion 40 may not be connected to the outer tubular portion 30, and the flexibility may be obtained without providing the gap portions 42.

Figure 7:
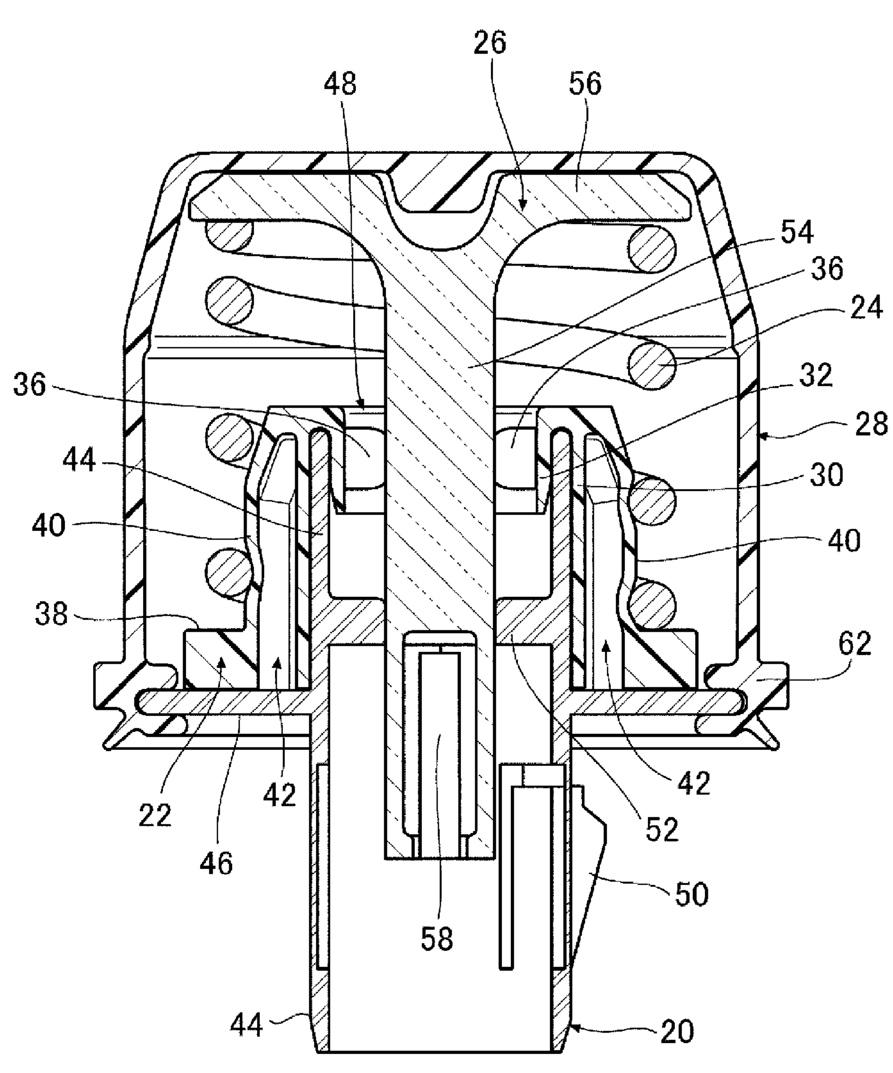
FIG. 7 is a sectional view of the damper.

FIG. 7 is a sectional view of the damper 10. A cross-sectional position shown in FIG. 7 is the same as that in FIG. 6. The engagement portion 62 of the cover 28 is engaged with the flange portion 46, and the cover 28 covers internal structures such as the spring 24 and the piston 26.

The shaft portion 54 of the piston 26 is inserted into the insertion hole 48 of the fixing member 20, and the retaining portion 58 of the piston 26 is caught by the inner protruding portion 52 of the fixing member 20. The spring 24 biases the disk portion 56 of the piston 26, and the biased piston 26 is retained by the retaining portion 58.

The outer tubular portion 30 of the sliding member 22 is disposed on an outer side of the tubular portion 44, the inner tubular portion 32 is disposed on an inner side of the tubular portion 44, and the outer tubular portion 30 and the inner tubular portion 32 are disposed to sandwich the tubular portion 44. The sliding member 22 is attached to the tubular portion 44 such that the extending portion 34 rides on a tip end of the tubular portion 44.

The protruding portions 36 protrude inward in the radial direction inside the tubular portion 44 and come into contact with an outer peripheral surface of the piston 26. As a result, the protruding portions 36 slides as the piston 26 advances and retreats, and the movement of the piston 26 can be attenuated. Further, the inner tubular portion 32 supporting the protruding portions 36 is located inside the tubular portion 44, so that the movement of the protruding portions 36 is restricted by the tubular portion 44 via the inner tubular portion 32, and the protruding portions 36 can be in stable contact with the piston 26.

The inner protruding portion 52 is provided so as to surround the shaft portion 54 of the piston 26. The inner protruding portion 52 and the protruding portion 36 are spaced apart from each other while maintaining a constant axial distance, and the shaft portion 54 can be supported at two positions. As a result, the axial movement of the piston 26 can be suppressed, and the sliding of the protruding portions 36 can be stabilized.

The end (seat portion) of the spring 24 is seated on the base portion 38 of the sliding member 22. By seating the end of the spring 24 on the viscoelastic body, expansion and contraction operation of the spring 24 can be stabilized.

An inner diameter side of the spring 24 is in contact with the bulging portions 40 of the sliding member 22. Therefore, when the spring 24 expands and contracts, the spring 24 slides on the bulging portions 40. As a result, the vibration of the spring 24 can be attenuated. Further, the sliding member 22 executes sliding on the piston 26 with the protruding portions 36 and sliding on the spring 24 with the bulging portions 40, so that the damping performance of the damper 10 can be improved. The inner diameter side of the spring 24 is not in contact with the outer tubular portion 30 where the bulging portion 40 is not formed. That is, an inner diameter of the spring 24 is smaller than a diameter of a circumscribed circle of the bulging portion 40, and is larger than a diameter of a circumscribed circle of the outer tubular portion 30. If the spring 24 comes into contact with the relatively hard outer tubular portion 30, there is a concern that a portion in contact with the outer tubular portion 30 will not expand and contract, but the spring 24 can slide due to the contact of the spring 24 with the bulging portions 40.

Figure 8:
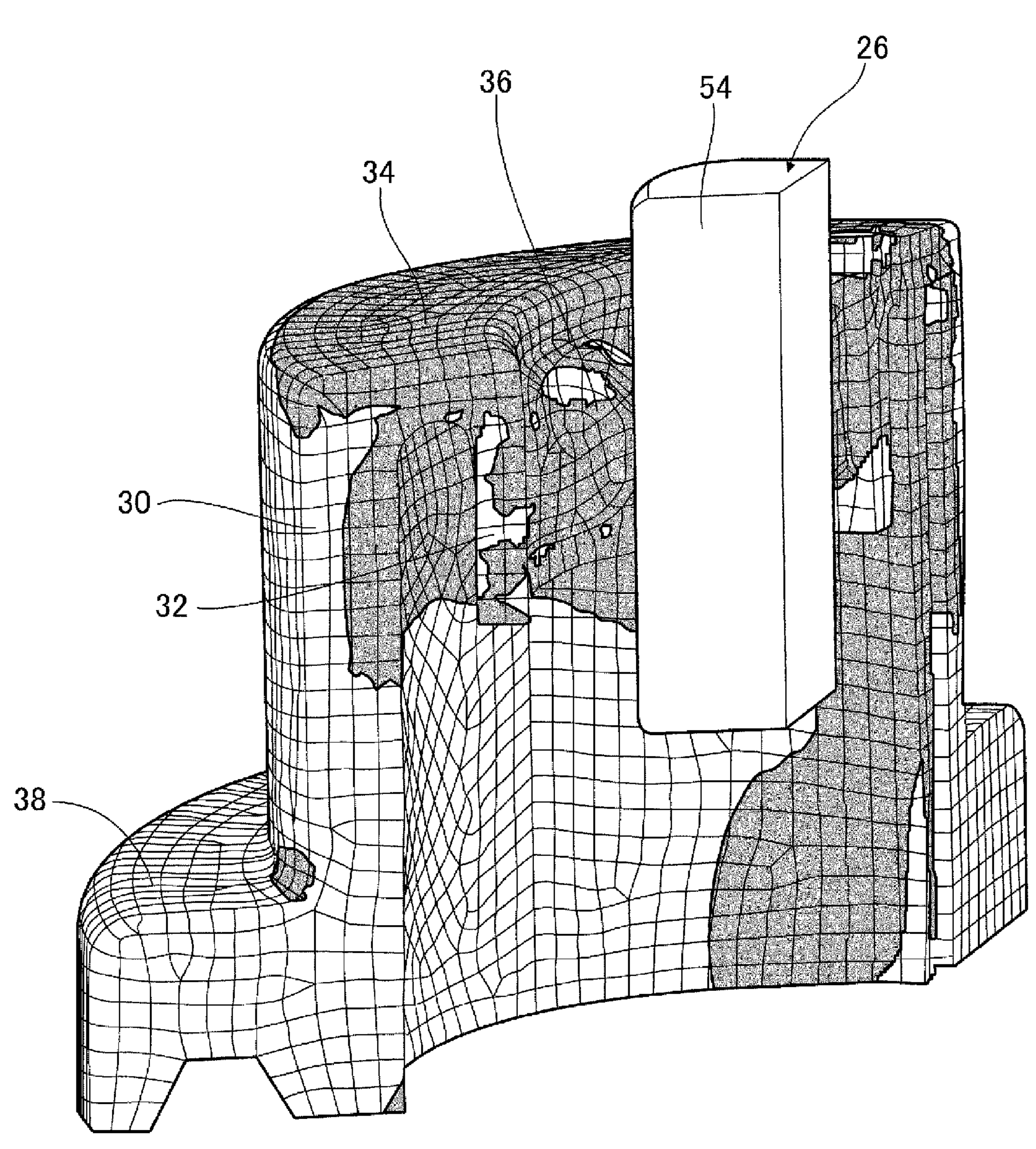
FIG. 8 is a diagram illustrating an operation when the sliding member slides on a piston.

FIG. 8 is a diagram illustrating an operation when the sliding member 22 slides on the piston 26. The protruding portions 36 slide on the piston 26 and move in the axial direction following the advance and retreat of the piston 26. FIG. 8 shows a state in which the extending portion 34 is lifted upward by the protruding portion 36 moving upward as the piston 26 advances, and shows a stress applied to the extending portion 34. A region to which stress is applied to the sliding member 22 due to the upward movement of the protruding portion 36 is shown in gray in FIG. 8. The extending portion 34 can be displaced up and down by protruding inward in the radial direction from the outer tubular portion 30.

The region to which the stress is applied is mainly illustrated from the protruding portion 36 to the extending portion 34. That is, the extending portion 34 is deformed by receiving stress due to vertical movement of the protruding portion 36, thereby exhibiting a damping force. In this way, the damping force can be exerted not only by the vertical displacement of the protruding portion 36 but also by the deformation of the extending portion 34, so that the damping performance of the damper 10 can be improved.

Figure 9:
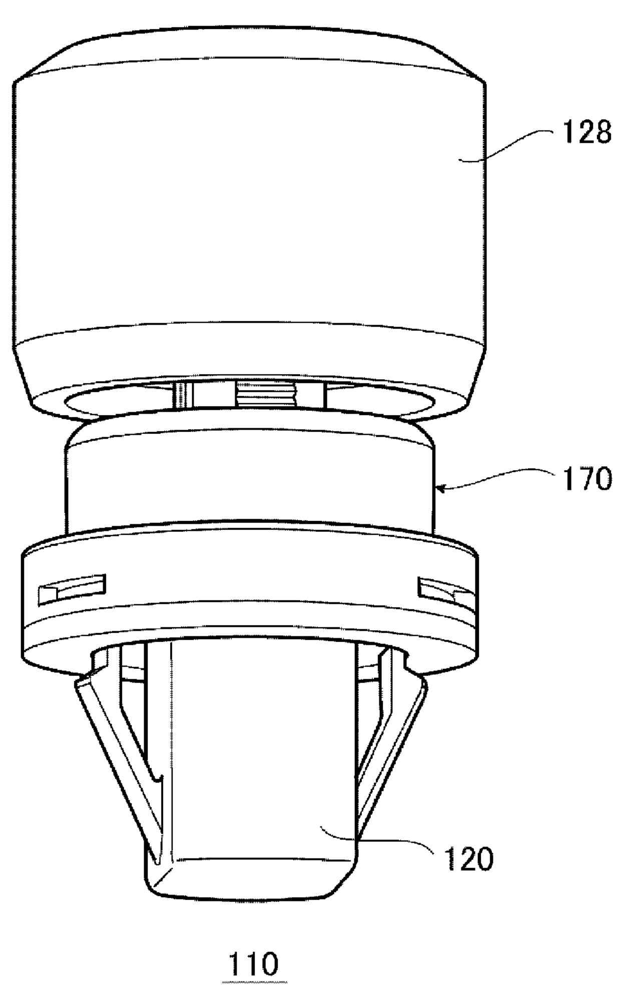
FIG. 9 is a perspective view of a damper according to a modification.
Figure 10:
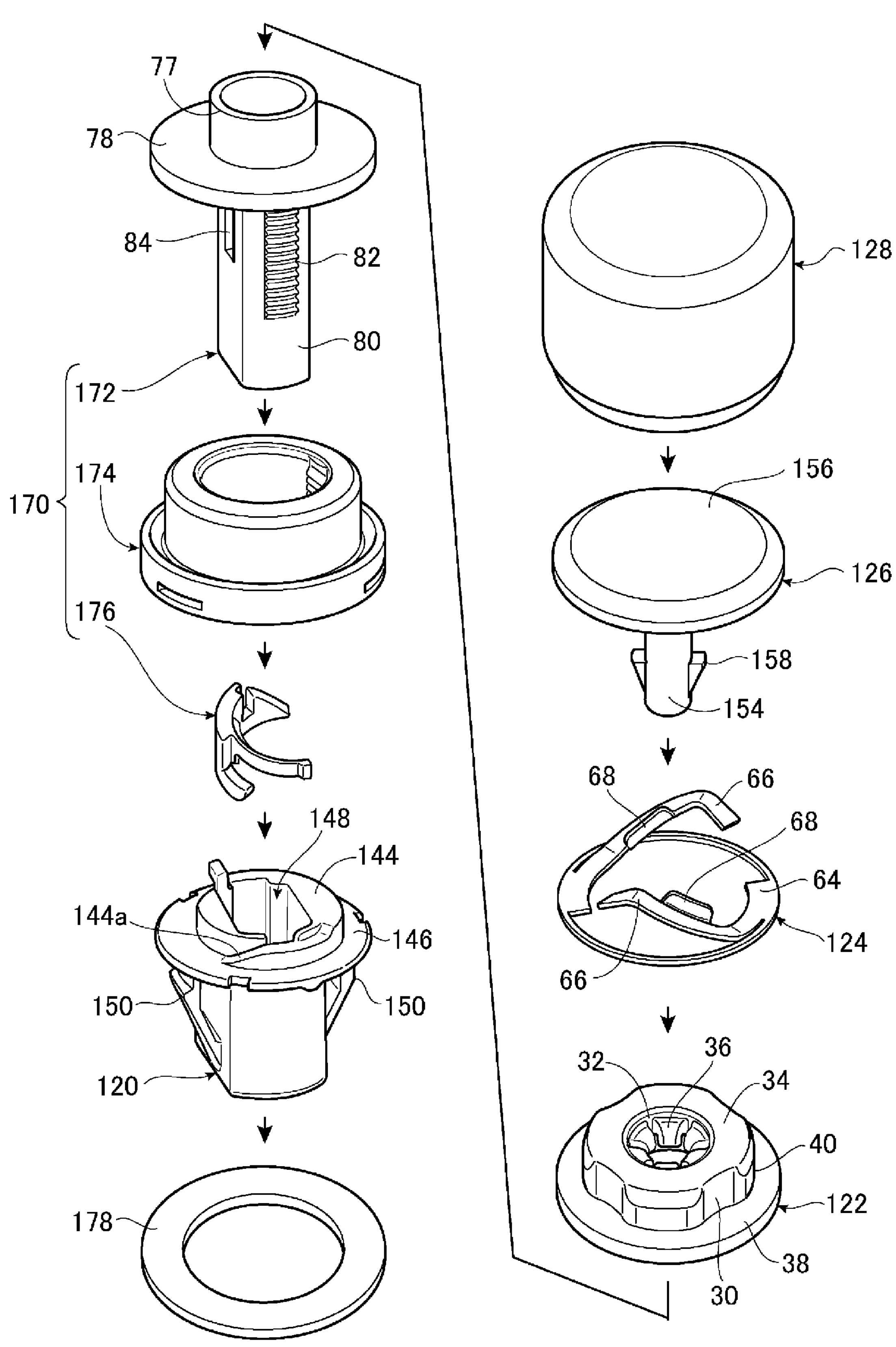
FIG. 10 is an exploded view of the damper according to the modification.

FIG. 9 is a perspective view of a damper 110 according to a modification. FIG. 10 is an exploded view of the damper 110 according to the modification. The damper 110 according to the modification is different from the damper 10 shown in FIG. 1 mainly in that a shape of a spring 124 is different and in that the damper 110 includes a height adjustment mechanism 170. In the modification, since the height adjustment mechanism 170 is provided, a sliding member 122 is supported by a moving member 172, which is different from the damper 10 shown in FIG. 1 in which the sliding member 22 is supported by the fixing member 20. That is, a support member of the sliding member 122 is the moving member 172 in the modification, and is the fixing member 20 in FIG. 1.

The damper 110 includes a fixing member 120, the sliding member 122, the spring 124, a piston 126, a cover 128, the height adjustment mechanism 170, and a washer 178.

The fixing member 120 includes a protrusion 144, a flange portion 146, an insertion hole 148, and locking claws 150. A pair of locking claws 150 are formed on both side surfaces of the fixing member 120, can be bent, and are locked to an edge of an attachment hole of an opening and closing body. The protrusion 144 protrudes from the flange portion 146 and is formed in a substantially annular shape. The moving member 172 can be inserted into the insertion hole 148.

The protrusion 144 has a guide portion 144*a* that extends from the flange portion 146 toward an upper end side of the protrusion 144 and that is formed as an inclined surface. The guide portion 144*a* guides rotation of a gear member 176. The washer 178 is attached to a lower side of the flange portion 146.

The cover 128 is formed in a cup shape with a viscoelastic material or a soft elastomer material, and covers the sliding member 122, the spring 124, and the piston 126. The cover 128 is engaged with the moving member 172.

The piston 126 includes a shaft portion 154, a disk portion 156, and a retaining portion 158. The shaft portion 154 is formed in a rod shape. The disk portion 156 is formed on a tip end side of the shaft portion 154, and protrudes outward in the radial direction. The retaining portion 158 is formed in a claw shape on a base end side of the shaft portion 154, and protrudes outward in the radial direction. The retaining portion 158 is caught by the moving member 172 and retains the piston 126.

The sliding member 122 includes the outer tubular portion 30, the inner tubular portion 32, the extending portion 34, the protruding portions 36, the base portion 38, and the bulging portions 40. The outer tubular portion 30 is formed in a tubular shape, and the inner tubular portion 32 is formed in a cylindrical shape and is located inside the outer tubular portion 30. The outer tubular portion 30 and the inner tubular portion 32 are spaced apart from each other in the radial direction, and one end of the outer tubular portion 30 is coupled to one end of the inner tubular portion 32 by the extending portion 34.

The protruding portion 36 protrudes inward in the radial direction from the inner tubular portion 32. A plurality of the protruding portions 36 are formed to be spaced apart from each other in a peripheral direction. Each of the protruding portions 36 may protrude from the upper end surface of the extending portion 34 or may protrude from the lower end of the inner tubular portion 32.

The base portion 38 protrudes outward in the radial direction from the outer tubular portion 30. A seat portion of the spring 124 is seated on the base portion 38 and the base portion 38 is seated on the moving member 172. The bulging portions 40 are formed so as to bulge outward in the radial direction from the outer surface of the outer tubular portion 30, and come into contact with the spring 124. A plurality of the bulging portions 40 are formed to be spaced apart from each other in the peripheral direction. A gap may be formed inside the bulging portions 40.

The spring 124 includes a seat portion 64 and rising pieces 66. The spring 124 is a metal plate spring. Since the spring 124 is a plate spring, the spring 124 can be made smaller in the axial direction than a coil spring, and the spring can be attached even if a distance between the opening and closing body and the panel on the vehicle body side is small. The spring 124 will be described with reference to FIGS. 11A and 11B.

Figures 11A, 11B:
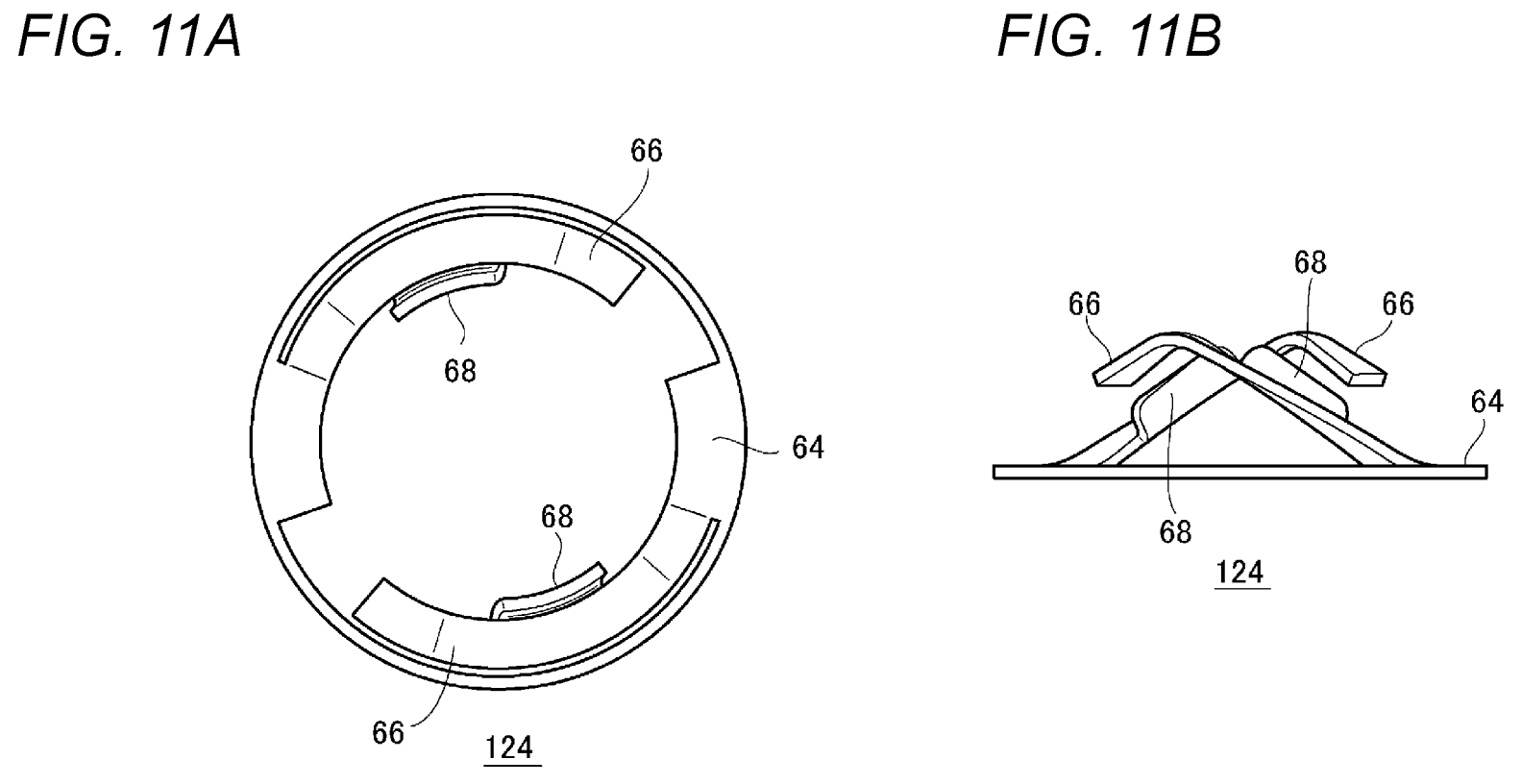

FIG. 11A is a top view of the spring 124, and FIG. 11B is a side view of the spring 124. The seat portion 64 is formed in an annular shape and is seated on the base portion 38 of the sliding member 122. The rising pieces 66 rise from the seat portion 64 and are formed in an arc shape in the top view shown in FIG. 11A. The rising pieces 66 are in contact with the disk portion 156 of the piston 126. A tip end portion of the rising piece 66 is bent so as to be folded back toward the seat portion 64.

Each of the rising piece 66 has a sliding piece 68 formed on an inner edge. The sliding piece 68 is bent upward at the inner edge of the rising piece 66, and forms a surface along the axial direction. The sliding piece 68 of the rising piece 66 slides on the outer tubular portion 30 of the sliding member 122, in particular, the bulging portion 40 of the outer tubular portion 30.

Refer back to FIG. 10. The height adjustment mechanism 170 includes the moving member 172, a rotating member 174, and the gear member 176. The height adjustment mechanism 170 that movably holds the height of the moving member 172 with respect to the fixing member 120 is disposed between the fixing member 120 and the moving member 172. The moving member 172 includes a tubular portion 77, a flange portion 78, an insertion hole 79, a shaft portion 80, tooth portions 82, and a retaining hole 84.

The moving member 172 is movable in the axial direction with respect to the fixing member 120, and also functions as a support member that supports the sliding member 122. The shaft portion 80 is formed in a rectangular tube shape and is inserted into the insertion hole 148 of the fixing member 120. The tooth portions 82 are formed on both side surfaces of the shaft portion 80 along the axial direction.

The flange portion 78 protrudes outward in the radial direction from the tubular portion 77 and is formed in a disk shape. The tubular portion 77 having a cylindrical shape is formed in an upper portion of the flange portion 78, and the shaft portion 80 is formed in a lower portion of the flange portion 78. The tubular portion 77 and the shaft portion 80 are coaxially formed. The retaining hole 84 is formed on a side surface of the shaft portion 80 in order to retain the piston 126. The insertion hole 79 is formed from the tubular portion 77 to an inner side of the shaft portion 80, and opens upward in the axial direction. The height adjustment mechanism 170 will be described with reference to a new drawing.

Figure 12:
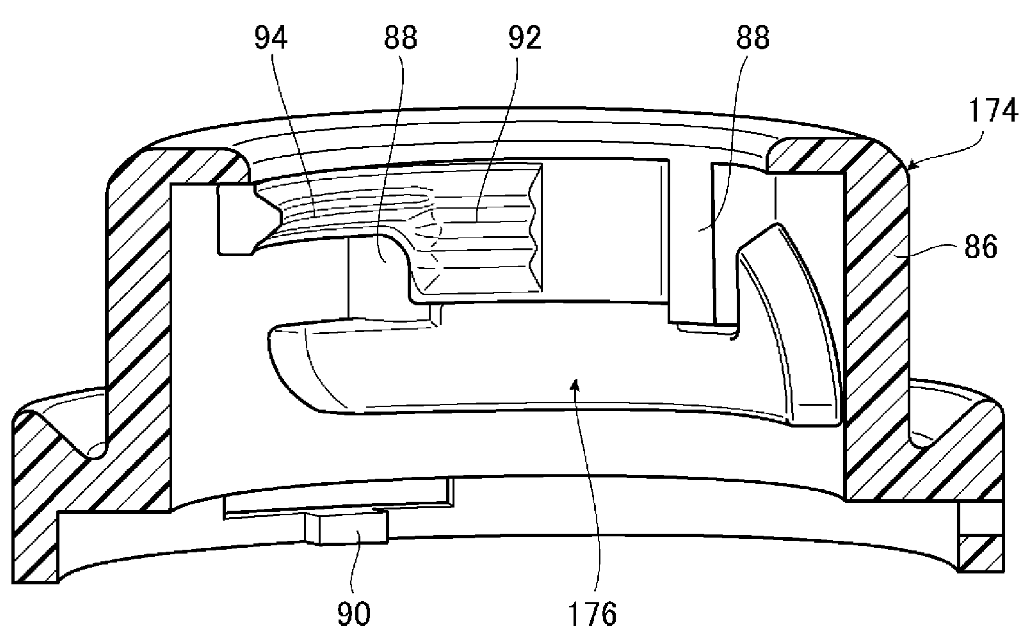
FIG. 12 is a perspective sectional view of a rotating member and a gear member.

FIG. 12 is a perspective sectional view of the rotating member 174 and the gear member 176. The gear member

176 is attached to the inside of the rotating member 174. The rotating member 174 includes a cylindrical portion 86, support portions 88, and an inner protrusion 90. A plurality of support portions 88 are formed to protrude toward an inner side of the cylindrical portion 86. The support portions 88 are engaged with the gear member 176 to support the gear member 176.

The inner protrusion 90 is formed to protrude inward in the radial direction and can be displaced in the radial direction. The inner protrusion 90 is engaged with the flange portion 146 of the fixing member 120 to suppress the rotating member 174 from being detached from the fixing member 120.

The gear member 176 has a multi-stage peak portion 92 and an extended peak portion 94. The multi-stage peak portion 92 has a multi-stage shape, while the extended peak portion 94 forms one peak portion. The extended peak portion 94 is connected to the multi-stage peak portion 92, and has fewer peak portions than the multi-stage peak portion 92. The extended peak portion 94 is disposed away from the cylindrical portion 86, and can be bent outward in the radial direction. The rotating member 174 and the gear member 176 rotate about a central axis with respect to the moving member 172.

Figure 13B:
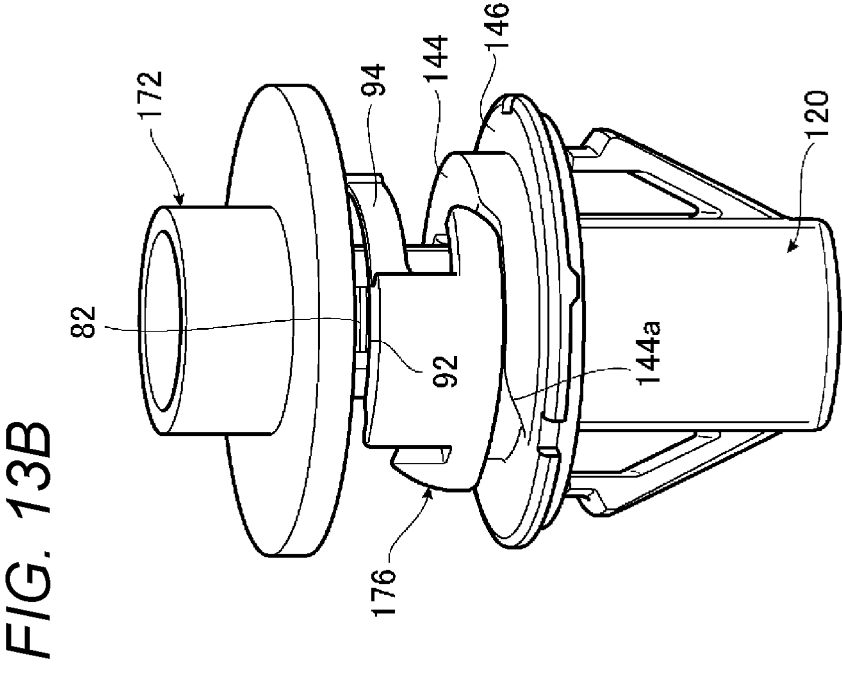
FIGS. 13A and 13B are views illustrating an operation of a height adjustment mechanism, and perspective views of a fixing member, a moving member, and the gear member.
Figure 13A:
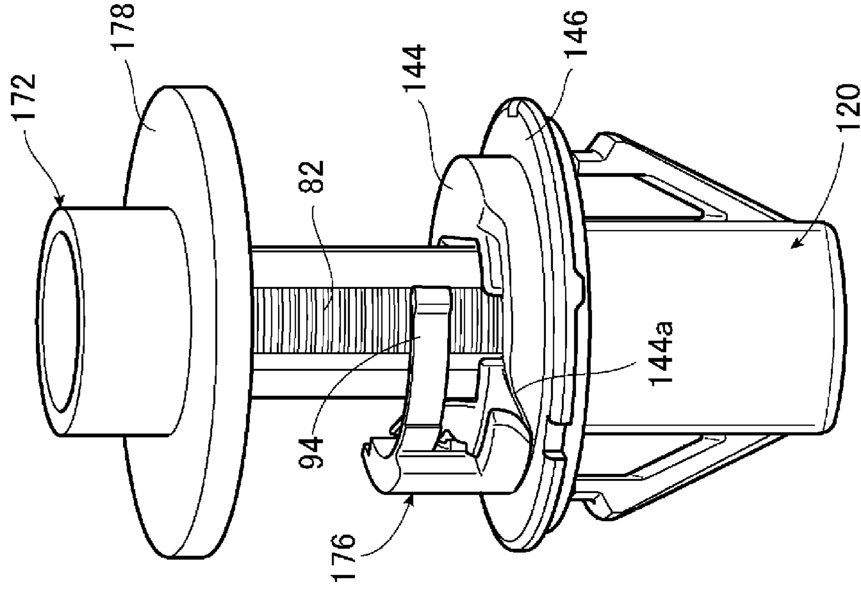

FIGS. 13A and 13B are views illustrating an operation of the height adjustment mechanism 170, and show perspective views of the fixing member 120, the moving member 172, and the gear member 176. The gear member 176 can take two positions by rotation, a locked state in which the movement of the moving member 172 is restricted, and an unlocked state in which the moving member 172 is in a movable state. FIG. 13A shows the gear member 176 in the unlocked state, and FIG. 13B shows the gear member 176 in the locked state. Although not shown, the rotating member 174 rotates integrally with the gear member 176.

When the gear member 176 is in the unlocked state as shown in FIG. 13A, the extended peak portion 94 is engaged with the tooth portion 82 of the moving member 172. Since the extended peak portion 94 can be bent in the radial direction, the moving member 172 can move in the axial direction while bending the extended peak portion 94. In addition, since the extended peak portion 94 is engaged with the tooth portion 82, a position of the moving member 172 in the axial direction can be maintained.

On the other hand, when the gear member 176 is in the locked state as shown in FIG. 13B, the multi-stage peak portion 92 is engaged with the tooth portion 82. Accordingly, movement of the moving member 172 in the axial direction is stopped. In the unlocked state, the gear member 176 is seated on the flange portion 146, and in the locked state, the gear member 176 is guided by the guide portion 144*a* to ride on the protrusion 144. In this way, by rotating the gear member 176, the moving member 172 is made movable and non-movable in the axial direction with respect to the fixing member 120 to enable height adjustment. Accordingly, an advancing and retreating stroke amount of the piston 126 can be adjusted to be small, and an advancing and retreating stroke of the piston 126 can be stabilized.

Figure 14:
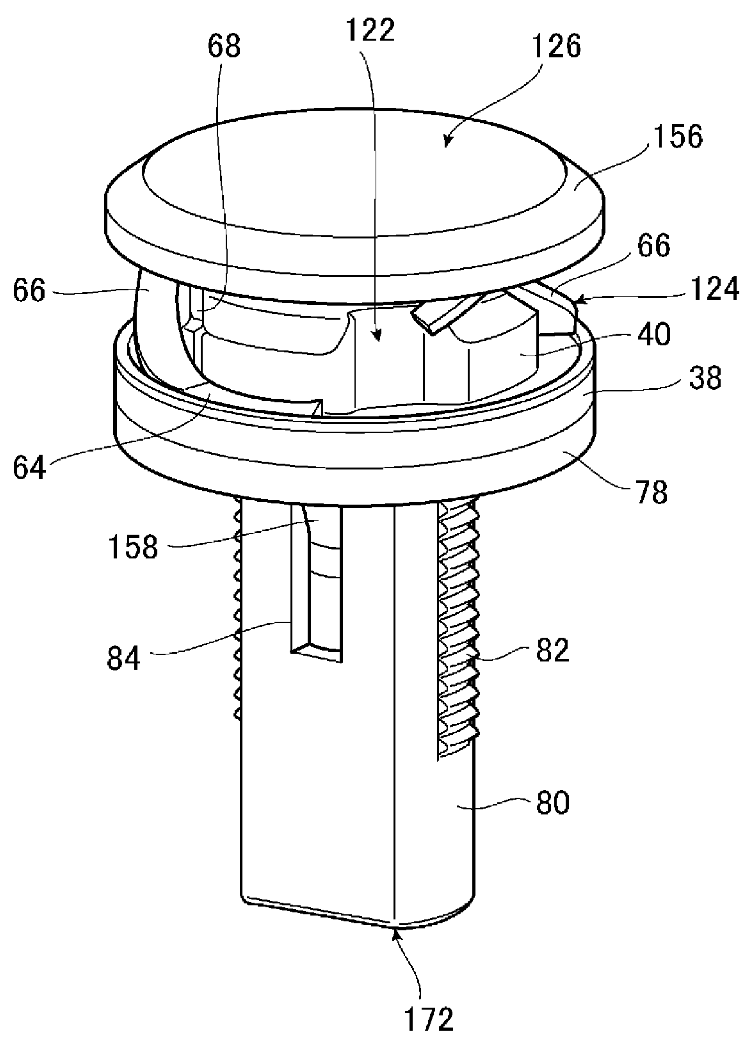
FIG. 14 is a perspective view of a sliding member, the spring, a piston, and the moving member, showing a state in which the sliding member, the spring, and the piston are attached to the moving member.

FIG. 14 is a perspective view of the sliding member 122, the spring 124, the piston 126, and the moving member 172, and shows a state in which the sliding member 122, the spring 124, and the piston 126 are attached to the moving member 172.

The base portion 38 of the sliding member 122 is seated on the flange portion 78 of the moving member 172, and the seat portion 64 of the spring 124 is seated on the base portion 38. The piston 126 is inserted through the sliding member 122, and the retaining portion 158 enters the retaining hole 84. The sliding member 122 and the spring 124 are placed on the moving member 172.

When the moving member 172 moves in the axial direction, the sliding member 122, the spring 124, and the piston 126 mounted on the moving member 172 also move in the axial direction. Since the cover 128 is also attached to the piston 126, the cover 128 moves together with the moving member 172. Accordingly, in a state in which the opening and closing body is closed, a protrusion height of the piston 126 can be adjusted in accordance with a distance difference between the opening and closing body and the panel on the vehicle body side, and the damping performance can be stabilized.

The rising pieces 66 of the spring 124 are in contact with a back surface of the disk portion 156 of the piston 126, and bias the piston 126 upward in the axial direction. As a result, when the piston 126 is pushed and retreat, the rising pieces 66 can be pushed back to original positions. For example, when the opening and closing body or the vehicle body side vibrates in a state in which the opening and closing body is closed, the piston 126 is pushed back by the rising pieces 66 to advance and retreat.

The sliding piece 68 of the rising piece 66 slides on the sliding member 122, in particular, the bulging portion 40 of the outer tubular portion 30 as the piston 126 advances and retreats. As a result, friction is generated as the piston 126 advances and retreats, and a damping force can be generated. Further, since the sliding piece 68 has a surface along the axial direction, the sliding member 122 is less likely to be damaged. Further, the advancing and retreating stroke of the piston 126 can be adjusted to be small by the height adjustment mechanism 170, and a stroke of the rising piece 66 can also be reduced. As a result, sagging of the rising pieces 66 can be suppressed, and a biasing force of the spring can be stabilized.

Figure 15:
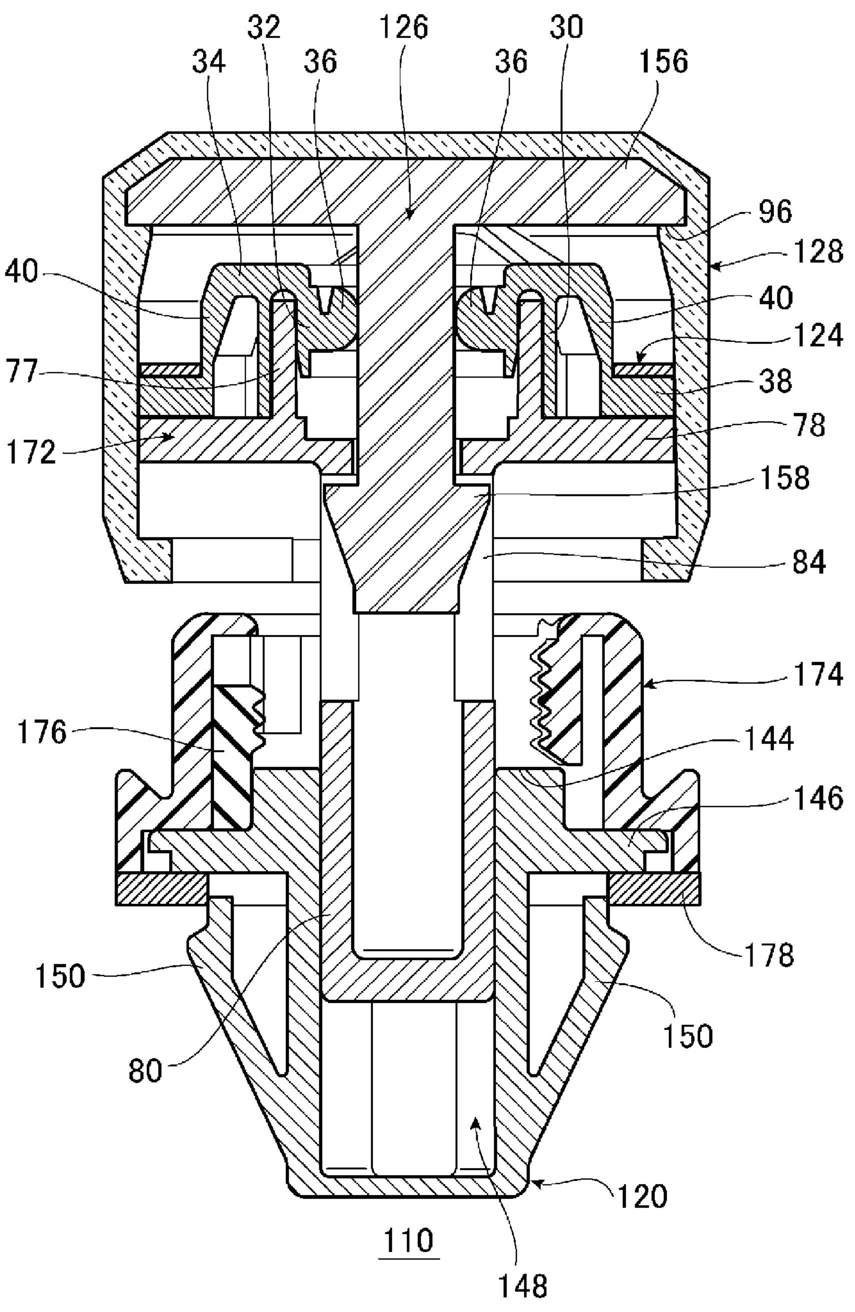
FIG. 15 is a sectional view of the damper according to the modification.
Figure 16:
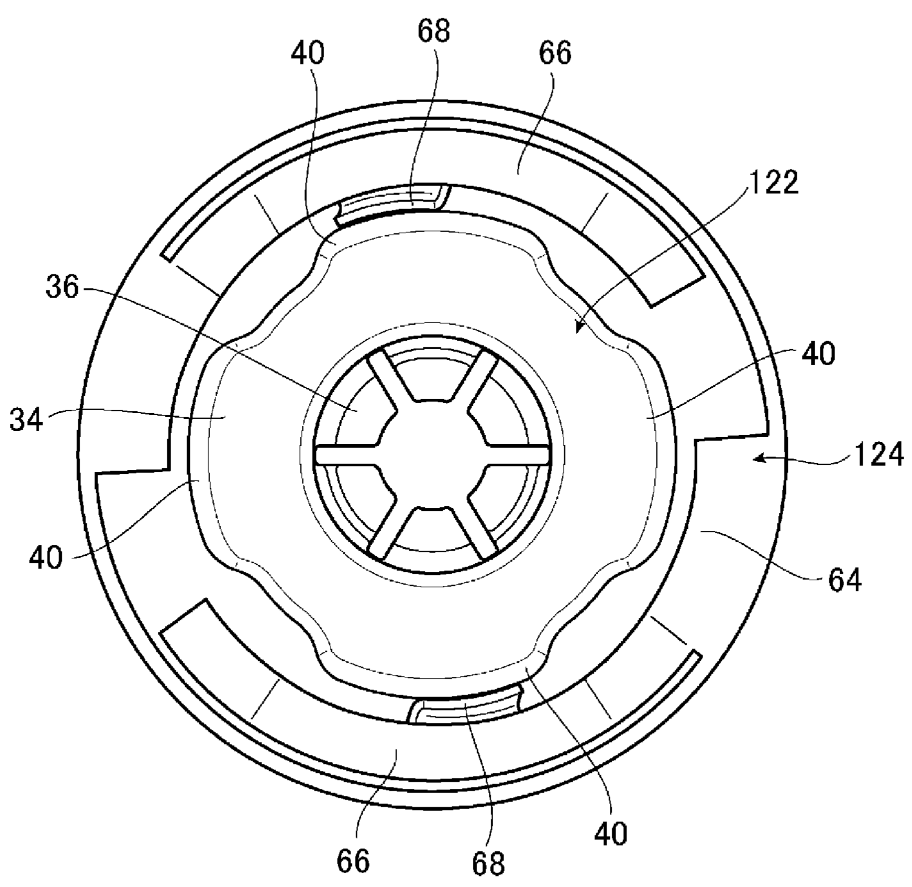
FIG. 16 is a top view of the sliding member and the spring in the damper according to the modification.

FIG. 15 is a sectional view of the damper 110 according to the modification. FIG. 16 is a top view of the sliding member 122 and the spring 124 in the damper 110. In FIG. 15, the gear member 176 is placed on the flange portion 146, and is in the unlocked state as shown in FIG. 13A. The moving member 172 can move in the axial direction in a state in which the shaft portion 80 is inserted into the insertion hole 148 of the fixing member 120.

The cover 128 includes a locking portion 96 that is locked to the disk portion 156 of the piston 126. The sliding member 122, the spring 124, the piston 126, and the moving member 172 are provided inside the cover 128.

The shaft portion 154 of the piston 126 is inserted into the insertion hole 79 of the moving member 172. The inner tubular portion 32 and the protruding portions 36 of the sliding member 122 are located inside the tubular portion 77 of the moving member 172, and the outer tubular portion 30 is located outside the tubular portion 77. The protruding portions 36 come into contact with the shaft portion 154 of the piston 126.

The protruding portions 36 of the sliding member 122 slide on the piston 126 when the piston 126 advances or retreats. Further, as shown in FIG. 16, the sliding piece 68 of the rising piece 66 is in contact with the bulging portion 40 of the outer tubular portion 30, and the sliding piece 68 of the rising piece 66 slides on the bulging portion 40 of the outer tubular portion 30 when the piston 126 advances or retreats. In addition to the sliding of the protruding portion 36, the sliding piece 68 of the rising piece 66 also slides, so that the damping performance can be improved.

The present invention is not limited to the embodiment described above, and various modifications such as design changes can be added to the embodiments based on the knowledge of those skilled in the art, and embodiments to which such modifications are added can also be included in the scope of the present invention.

In the embodiment, an aspect in which the protruding portion 36 is provided on an inner peripheral surface of the inner tubular portion 32 is shown, but the present invention is not limited to this aspect, and the protruding portion 36 may be provided in the extending portion 34 without providing the inner tubular portion 32. That is, the extending portion 34 indirectly couples the protruding portion 36 and the outer tubular portion 30 via the inner tubular portion 32, or directly couples the protruding portion 36 and the outer tubular portion 30 to each other.

In addition, in the embodiment, an aspect in which the gap portion 42 is formed inside the bulging portion 40 is shown, but an aspect in which the gap portion 42 is not formed is also possible by reducing a width of the bulging portion 40 to make it easier to bend. In addition, in the embodiment, an aspect in which the first groove portion **36*a* and the second groove portion 36*b* are formed in the protruding portion 36** is shown, but the present invention is not limited to this aspect, and the groove portion may not be formed.

Further, the spring 124 in the modification may be used in the damper 10 shown in FIG. 1. In any case, the spring 124 biases the piston 26, 126 upward in the axial direction, and slides on the outer tubular portion 30 of the sliding member 22, 122 as the piston 26, 126 advances and retreats.

Further, an aspect in which the height adjustment mechanism 170 includes the rotating member 174 and the gear member 176 is shown, but the present invention is not limited to this aspect. For example, the fixing member 120 may have a female screw, the moving member 172 may have a male screw, and the female screw of the fixing member 120 and the male screw of the moving member 172 may be screwed to enable height adjustment. In yet another aspect, a lock member that locks the tooth portions 82 of the moving member 172 may be used instead of the rotating member 174 and the gear member 176. For example, the lock member may include a locking claw that locks onto the tooth portions 82 and a rotating shaft portion that is orthogonal to the axial direction, and may be configured to take a locked state and an unlocked state by rotation.

INDUSTRIAL APPLICABILITY

The present invention relates to a damper that is interposed between a first member and a second member to suppress vibration of the second member with respect to the first member.

REFERENCE SIGNS LIST

10 damper
20 fixing member
22 sliding member
24 spring
26 piston
28 cover
30 outer tubular portion
32 inner tubular portion
34 extending portion
36 protruding portion
**36*a*** first groove portion
**36*b*** second groove portion
38 base portion
40 bulging portion
**40*a*** tapered portion
42 gap portion
44 tubular portion
46 flange portion
48 insertion hole
50 locking claw
52 inner protruding portion
54 shaft portion
56 disk portion
58 retaining portion
60 recessed portion
62 engagement portion

The invention claimed is:

1. A damper configured to be interposed between a first member and a second member to suppress vibration of the second member with respect to the first member, the damper comprising:
- a fixing member configured to be fixed to one of the first member and the second member, and including a tubular portion and an insertion hole formed inside the tubular portion;
- a piston inserted through the insertion hole and configured to advance and retreat by receiving a force from another of the first member and the second member;
- a sliding member configured to slide on the piston as the piston advances and retreats; and
- a spring configured to bias the piston,
- wherein the sliding member includes
  - a protruding portion protruding inward in a radial direction inside the tubular portion and configured to come into contact with an outer peripheral surface of the piston,
  - an outer tubular portion disposed outside the tubular portion, and
  - an extending portion extending inward in the radial direction from one end of the outer tubular portion and indirectly or directly coupling the protruding portion and the outer tubular portion,
- wherein, in the radial direction, an inner peripheral surface of the outer tubular portion faces an outer peripheral surface of the tubular portion, and is disposed outside the outer peripheral surface of the tubular portion,
- wherein the sliding member includes a bulging portion formed to bulge outward in the radial direction from an outer surface of the outer tubular portion,
- wherein a gap is formed inside the bulging portion in the radial direction, and
- wherein the spring is disposed outside the bulging portion in the radial direction.

2. The damper according to claim 1,
- wherein the sliding member further includes an inner tubular portion disposed inside the tubular portion,
- wherein the extending portion couples the inner tubular portion and the outer tubular portion, and
- wherein the protruding portion protrudes inward in the radial direction from the inner tubular portion.

3. The damper according to claim 1,
- wherein the sliding member includes a base portion protruding outward in the radial direction from the outer tubular portion, and
- wherein a seat portion of the spring is seated on the base portion.

4. The damper according to claim 3, wherein the bulging portion is configured to come into contact with an inner side of the spring.

5. The damper according to claim 1, wherein the sliding member is a viscoelastic body.

6. The damper according to claim 3, wherein the spring has a rising piece rising from the seat portion and configured to come into contact with the piston.

7. The damper according to claim 6, wherein the rising piece is slidable on the outer tubular portion.

8. The damper according to claim 1, wherein the sliding member further includes an inner tubular portion disposed inside the tubular portion, and wherein an axial length of the inner tubular portion is shorter than that of the outer tubular portion.

9. The damper according to claim 1, wherein a plurality of the protruding portions are formed to be spaced apart from each other in a peripheral direction, and wherein a first groove portion and a second groove portion are alternately formed in the plurality of protruding portions.

10. The damper according to claim 9, wherein the first groove portion is formed to be recessed downward from above, and the second groove portion is formed to be recessed upward from below.

11. The damper according to claim 9, wherein the first groove portion and the second groove portion are formed by notching a base end side of each of the protruding portions along the peripheral direction.

12. The damper according to claim 1, wherein a plurality of the bulging portions are formed to be spaced apart from each other in a peripheral direction, and wherein a plurality of the gaps are formed to be spaced apart from each other in the peripheral direction.

13. A damper configured to be interposed between a first member and a second member, configured to be fixed to one of the first member and the second member, and configured to suppress vibration of the second member with respect to the first member, the damper comprising:

a piston configured to advance and retreat by receiving a force from another of the first member and the second member;

a sliding member configured to slide on the piston as the piston advances and retreats; and a support member having a tubular portion and an insertion hole formed inside the tubular portion; and a spring configured to bias the piston, wherein the piston is inserted through the insertion hole, wherein the sliding member includes a protruding portion protruding inward in a radial direction inside the tubular portion and configured to come into contact with an outer peripheral surface of the piston, an outer tubular portion disposed outside the tubular portion, and an extending portion extending inward in the radial direction from one end of the outer tubular portion and indirectly or directly coupling the protruding portion and the outer tubular portion, wherein, in the radial direction, an inner peripheral surface of the outer tubular portion faces an outer peripheral surface of the tubular portion, and is disposed outside the outer peripheral surface of the tubular portion, wherein the sliding member includes a bulging portion formed to bulge outward in the radial direction from an outer surface of the outer tubular portion, wherein a gap is formed inside the bulging portion in the radial direction, and wherein the spring is disposed outside the bulging portion in the radial direction.

14. The damper according to claim 13, further comprising:

a fixing member configured to be fixed to one of the first member and the second member, wherein the support member is provided movably in an axial direction, wherein a height adjustment mechanism configured to movably hold a height of the support member with respect to the fixing member is disposed between the fixing member and the support member, and wherein the sliding member is placed on the support member and is configured to move in the axial direction as the support member moves.

15. The damper according to claim 13, wherein the sliding member further includes an inner tubular portion disposed inside the tubular portion, and wherein an axial length of the inner tubular portion is shorter than that of the outer tubular portion.

16. The damper according to claim 13, wherein a plurality of the protruding portions are formed to be spaced apart from each other in a peripheral direction, and wherein a first groove portion and a second groove portion are alternately formed in the plurality of protruding portions.

17. The damper according to claim 16, wherein the first groove portion is formed to be recessed downward from above, and the second groove portion is formed to be recessed upward from below.

18. The damper according to claim 16, wherein the first groove portion and the second groove portion are formed by notching a base end side of each of the protruding portions along the peripheral direction.

19. The damper according to claim 13, wherein a plurality of the bulging portions are formed to be spaced apart from each other in a peripheral direction, and wherein a plurality of the gaps are formed to be spaced apart from each other in the peripheral direction.

* * * * *